April 18, 1967 J. VERTUT 3,314,552
MASTER SLAVE MANIPULATOR WITH ARTICULATED ARMS
Filed Nov. 12, 1964 9 Sheets-Sheet 7

April 18, 1967   J. VERTUT   3,314,552
MASTER SLAVE MANIPULATOR WITH ARTICULATED ARMS
Filed Nov. 12, 1964   9 Sheets-Sheet 9

United States Patent Office 3,314,552
Patented Apr. 18, 1967

3,314,552
MASTER SLAVE MANIPULATOR WITH ARTICULATED ARMS
Jean Vertut, Paris, France, assignor to Commissariat à l'Energie Atomique, Paris, France
Filed Nov. 12, 1964, Ser. No. 410,470
Claims priority application France, Nov. 15, 1963, 953,982; Oct. 29, 1964, 993,170
19 Claims. (Cl. 214—1)

The present invention relates to the so-called "master-slave" manipulators which, as a rule, are simple machines comprising a control handle and a handling grab which reproduces all the movements imparted to the handle.

The invention is more especially concerned with the two main types of manipulators of this type which are distinguished according to whether they penetrate within the handling enclosure or "hot cell" either through the roof or through a lateral wall, the second of these types being provided with at least two articulated arms at the ends of a horizontal through-tube.

Aside from the basic characteristics which are essential to their use such as frictionless and balanced operation, low inertia, ruggedness and so forth, manipulators of this type must be adapted to the use of a viewing window having small dimensions. It is for this purpose that such manipulators are usually capable of auxiliary movements which permit the possibility of varying the relative position of the grab with respect to the control handle, such relative movements being possible in the outward, lateral and/or upward directions.

The known master-slave manipulators of this type usually have telescopic arms which each consists of two or three tubular elements. This arrangement is subject to certain drawbacks:

The guiding mechanisms make it necessary to employ precision-made tubes with special profiles which nevertheless do not totally eliminate friction, The balancing of movable tubes makes it necessary to mount within parallel tubes counterweights of equal mass which are completed by stationary weights, thus at least doubling the inertia in the case of the telescopic movements and angular displacements, Difficult problems also arise in the design of flexible sealing members which are intended to protect the mechanisms against contamination and/or to ensure leaktightness of the handling enclosure.

It is a primary aim of this invention to provide a design wherein master-slave manipulators of the type hereinabove referred to are made to conform to a wide variety of practical requirements more effectively than has been possible heretofore. It is intended to achieve this aim and especially to avoid the above-mentioned disadvantages by providing master-slave manipulators with articulated arms which do not provide telescopic movement, said manipulators being endowed with advantageous characteristics from the point of view of friction and low inertia. Provision is additionally made for the possibility of relative displacement of the master arm and slave arm. At the same time, as will be understood, freedom of pivotal motion within the aperture which is formed through the wall of the handling enclosure is nevertheless permitted, although this last-mentioned possibility will not be taken into account in the following description of the characteristic features of the invention.

The invention mainly consists of a master-slave manipulator which comprises a stationary wall-traversing member provided at the extremities thereof with shoulder pivots on which are articulated two polygonal assemblies referred to as the "master" assembly and "slave" assembly respectively, each comprising at least one arm and one forearm, characterized in that on the one hand the master and slave arms are coupled together in such manner as to pivot about their respective shoulders through two angles in opposite directions subject to the possibility of a different constant angle and, on the other hand, the master and slave fore-arms are coupled together in such manner as to pivot about their respective elbows through angles in the same direction subject to the possibility of a different constant angle as is also the case with the similar master and slave members which are pivotally coupled to the respective wrists, said constant angles being capable of varying in an auxiliary manner, and a balancing of the master and slave arms and fore-arms being additionally provided.

The invention further consists, apart from this principal arrangement, in a certain number of other arrangements which are preferably employed at the same time and which are to be considered either separately or in accordance with any technically feasible combinations, viz:

At the time of their angular displacements about their elbows, the master and slave arms remain symmetrical subject to the possibility of a different constant angle relatively to the plane of the wall, said constant angle being capable of varying in an auxiliary manner.

At the time of their angular displacements about their shoulders, the master and slave fore-arms remain parallel subject to the possibility of a different constant angle, said constant angle being capable of varying in an auxiliary manner.

At the time of their angular displacements about their shoulders, the master and slave arms pivot through proportional angles in opposite directions subject to the possibility of a different constant angle, said constant angle being capable of varying in an auxiliary manner.

At the time of their angular displacements about their elbows, the master and slave fore-arms pivot through proportional angles in the same direction subject to the possibility of a different constant angle, said constant angle being capable of varying in an auxiliary manner.

Said constant angle which affects two similar members remains invariable at the time of angular displacements of the other members.

Said constant angle which affects two similar members is functionally dependent on the angular displacements of the other members.

Said constant angles can in addition be adjusted, in particular by motor means.

On the one hand the master arm is integral with a master shoulder pulley having the same axis as the angular movement of displacement about the master shoulder and, on the other hand, the slave arm is integral with a slave shoulder pulley having the same axis as the angular movement of displacement about the slave shoulder, said pulleys which have the same diameter being associated in their rotational movements by means of two cables, belts or chains which are oppositely acting and crossed.

On the other hand the master arm is integral with a master shoulder pulley having the same axis as the angular movement of displacement about the master shoulder and, on the other hand, the slave arm is integral with a slave shoulder pulley having the same axis as the angular movement of displacement about the slave shoulder, said pulleys which have different diameters in a ratio which is equal to that of the angles of displacement about the shoulders being associated in their rotational movements by means of two cables, belts or chains which are oppositely-acting and crossed.

The master arm is integral with a master shoulder pulley to which is secured a cable, belt or chain which is also wound onto a slave shoulder pulley which is integral with a toothed pinion having the same axis, said toothed pinion being adapted to mesh with a toothed sector which is integral with the slave arm, the successive diameters of said pulleys, of said pinion and of said sector being such as to ensure the desired ratio of the angles of displacement about the shoulders, said ratio being especially equal to one.

On the one hand, the master fore-arm is integral with a master elbow pulley having the same axis as the angular movement of displacement about the master elbow and, on the other hand, the slave fore-arm is integral with a slave elbow pulley having the same axis as the angular movement of displacement about the slave elbow, said elbow pulleys being associated in their rotational movements by means of two oppositely-acting cables, belts or chains which are adapted to pass over loose pulleys mounted on the master and slave shoulder-pins and also to pass over guide pulleys, the sum of the diameters of said loose pulleys being equal to the sum of the diameters of said elbow pulleys, said elbow pulleys having the same diameter.

On the one hand, the master fore-arm is integral with a master elbow pulley having the same axis as the angular movement of displacement about the master elbow and, on the other hand, the slave fore-arm is integral with a slave elbow pulley having the same axis as the angular movement of displacement about the slave elbow, said elbow pulleys being associated in their rotational movements by means of two oppositely-acting cables, belts or chains which are adapted to pass over two loose pulleys mounted on the master and slave shoulder pins and also to pass over guide pulleys, the sum of the diameters of said loose pulleys being equal to the sum of the diameters of said elbow pulleys, said elbow pulleys having different diameters in a ratio which is equal to that of the angles of displacement about the elbows.

On the one hand the master fore-arm is integral with a master elbow pulley having the same axis as the angular movement of displacement about the master elbow and, on the other hand, the slave fore-arm is integral with a slave elbow pulley having the same axis as the angular movement of displacement about the slave elbow, said elbow pulleys being associated in their rotational movements by means of two oppositely-acting cables, belts or chains which are adapted to pass over a loose pulley which is mounted on the master shoulder-pin and also to pass over a guide pulley, then in the opposite direction over two equal pulleys, one of which is mounted on the slave shoulder pin, the axles of said equal pulleys being coupled together by means of a connecting-arm which is caused to pivot through an angle which is one half the angle of radial displacement of the slave arm.

On the one hand, the master arm is integral with a master shoulder pulley having the same axis as the angular movement of displacement about the master shoulder and, on the other hand, the slave arm is integral with a slave shoulder pulley having the same axis as the angular movement of displacement about the slave shoulder, said pulleys being associated in their rotational movements, whilst said master arm can be additionally uncoupled from said master shoulder pulley and relatively displaced by a constant angle with respect to said master shoulder pulley, said relative displacement resulting in a corresponding relative displacement of the elbow movements, thereby causing the entire slave assembly to perform a pivotal movement as a single unit about the slave shoulder.

On the one hand, the master fore-arm is integral with a master elbow pulley having the same axis as the angular movement of displacement about the master elbow and, on the other hand, the slave fore-arm is integral with a slave elbow pulley having the same axis as the angular movement of displacement about the slave elbow, said elbow pulleys being associated in their rotational movements by means of two oppositely-acting cables, belts or chains which are adapted to pass over two loose pulleys mounted on the master and slave shoulder pins and also to pass over guide pulleys, said elbow pulleys having different diameters in a ratio which is equal to that of the angles of radial displacements of the elbows, the sum of the diameters of the elbow pulleys and the sum of the diameters of the shoulder pulleys being different, the ratio of these two sums being equal to the ratio of the angle of radial displacement about the master shoulder to the variation of said constant angle which is functionally dependent on the angular movements of displacement of the other members.

The balancing of the slave assembly is carried out at the level of the master shoulder by means of a counterweight carried by a connecting-arm which is adapted to pivot in the same direction and through a same angle as the slave arm, said counterweight being also adapted to swing about said connecting-arm through a same angle as the relative angular displacement of the slave fore-arm with respect to the slave arm by virtue of the utilization of one of the cables, belts or chains for the transmission of the angular movements of displacement of the elbows.

The balancing of the master assembly is carried out at the level of the master shoulder by means of a counterweight carried by an extension of the master arm, said counterweight being also adapted to swing about said extension through a same angle as the relative angular displacement of the master fore-arm with respect to the master arm by virtue of the utilization of one of the cables, belts or chains for the transmission of the angular movements of displacement of the elbows.

The balancing of the master assembly is ensured at the level of the master shoulder by means of a counterweight carried by a connecting-arm which is adapted to pivot in the same direction and through a same angle as the slave arm, said counterweight being also adapted to swing about said connecting-arm through a same angle as the relative angular displacement of the slave fore-arm with respect to the slave arm by virtue of the action of a connecting-arm which is secured at one end to said counterweight at a point which is different from its center and at the other end to an extension of the master fore-arm beyond the master elbow.

The invention will in any case be more clearly understood by consideration of the complementary description which now follows and by reference to the accompanying drawings, it being understood that said complementary description and drawings are given solely by way of indication and not in any sense by way of limitation.

Figure 1:
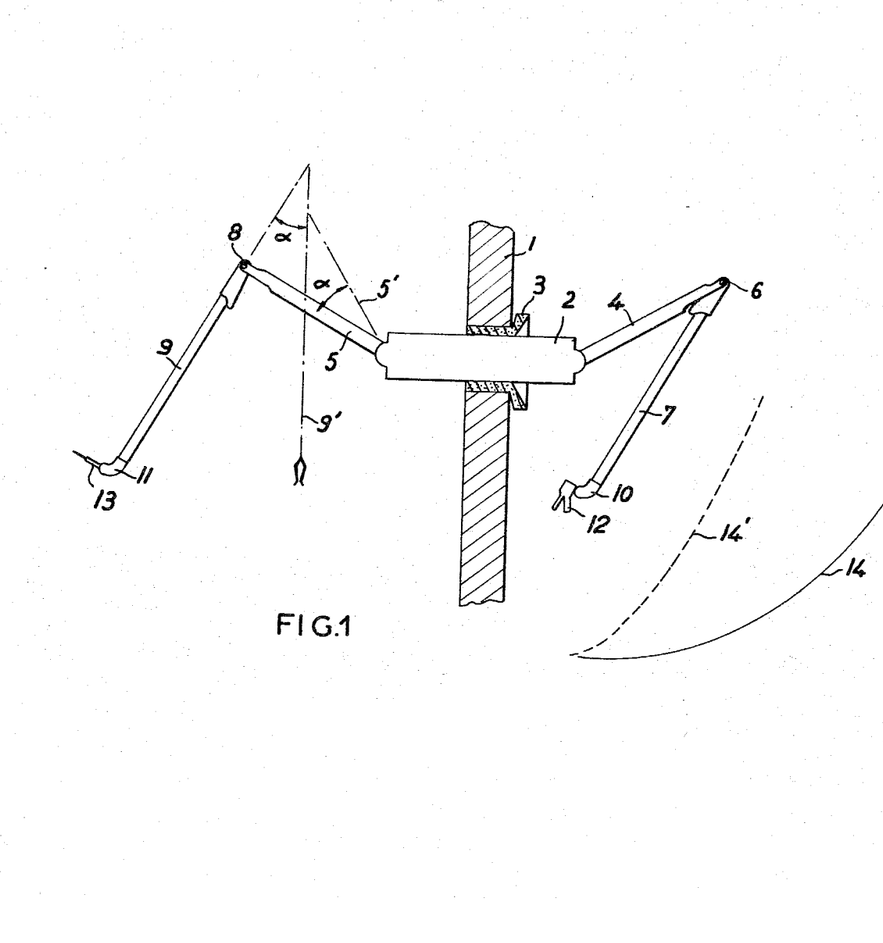
FIG. 1 is a diagram of a master-slave manipulator in accordance with the invention, comprising two articulated members.

As shown in FIG. 1, the shield wall 1 of the handling enclosure or "hot cell" is provided with an opening providing a passageway for the member 2 which traverses the wall and is fitted within an intermediate annular member or roller tube 3, said roller tube being designed to pivot about the horizontal axis of the member 2.

A master arm 4 and a slave arm 5 are associated in their respective pivotal movements in such manner as to remain symmetrical with respect to the wall 1. The master fore-arm 7 is pivotally coupled to the elbow 6 of the master arm 4 and the slave fore-arm 9 which corresponds to said master fore-arm is pivotally coupled to the elbow 8. These two master and slave fore-arms are associated in their pivotal movement about their respective elbows in such manner as to remain parallel to each other. Said fore-arms are capable of performing a movement of rotation about their longitudinal axes and are each provided with a wrist articulation, respectively designated by the references 10, 11, to which are pivotally coupled a control handle 12 at the master end which is endowed with two degrees of freedom of perpendicular movements of rotation and a handling grab 13 at the slave end which reproduces the same degrees of freedom. The three above-mentioned movements of rotation correspond in the case of the slave arm to those of the master arm and are transmitted by cables, belts, chains or any other suitable device.

It can be visualized that the distance between the handle 12 and the grab 13 is at a maximum when the arms 4 and 5 are horizontal. Accordingly, in order to work with the grab 13 close to the wall 1, the operator must place his hand at a considerable distance away from the work face and from the viewing windows. In order to reduce this distance and enable the operator to move the grab close to the wall while still remaining near the viewing window, the master-slave manipulator in accordance with the invention has been endowed with an auxiliary relative displacement of the arms, as also shown in FIG. 1.

This relative displacement consists in lifting the slave arm 5 to position 5' through an angle α without moving the master arm 4 and, at the same time, in moving the slave fore-arm 9 closer through the same angle α to the position designated by the reference 9' without moving the master arm 7. As a result of these auxiliary movements, the limit 14 of displacement of the handle 12 which enables the grab 13 to sweep the surface of the wall 1 has been advanced to 14'. Similarly, these relative displacements make it possible to align the slave members 5 and 9 for the purpose of withdrawing the master-slave manipulator from the handling enclosure or "hot cell" whereas the minimum angle between the master members 4 and 7 remains not zero.

Figure 2:
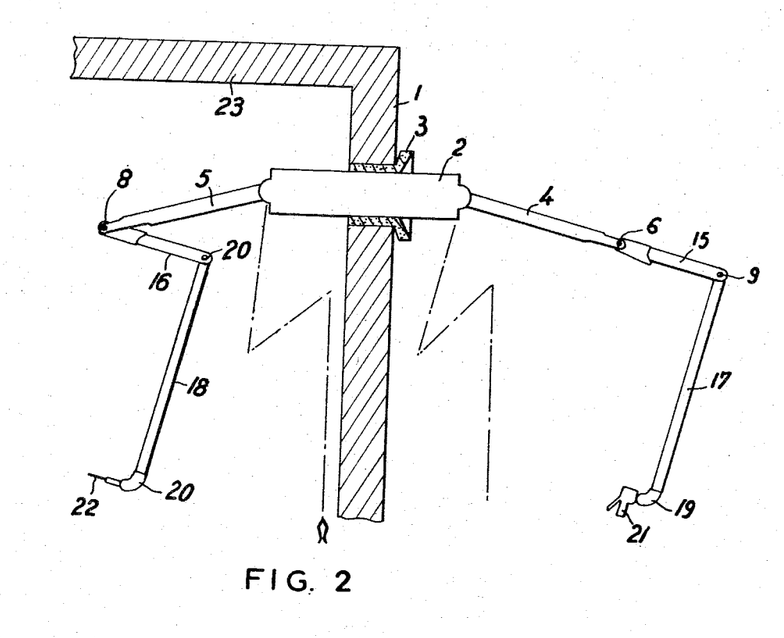
FIG. 2 is a diagram of a master-slave manipulator in accordance with the invention, comprising three articulated members.

There has been shown diagrammatically in FIG. 2 a master-slave manipulator in accordance with the invention and provided on each side of the enclosure wall with three articulated members. Similarly, the shield wall 1 accommodates the horizontal wall-traversing member 2 within an intermediate annular member or roller tube 3 which is capable of pivoting about its axis. At the ends of the member 2 are pivotally attached the master and slave arms 4 and 5, the angular movement of displacement of which is maintained symmetrical with respect to the wall 1, thereby permitting the possibility of varying the distance between the shoulders 6 and 8 to which are pivotally coupled first fore-arms 15 and 16 so associated as to remain parallel. Similarly, second fore-arms 17 and 18 are pivotally coupled to the shoulders 19 and 20 and are also associated in such manner as to remain parallel. Finally, the fore-arms 17 and 18 are fitted with the control handle 21 and the handling grab 22 which are pivotally attached to the wrists 19 and 20.

It will be apparent that the distance between the handle 21 and the grab 22 remains equal to the distance between the shoulders 6 and 8 and that said distance is capable of varying to a substantial extent at the time of symmetrical pivot movement of the arms 4 and 5. In addition, the radial extension of the slave members 5, 16 and 18 imparts a substantial amplitude of movement to the grab 22 even if the horizontal member 2 is placed close to the ceiling 23 of the handling enclosure or hot cell, the radial displacement of the slave arm 5 being thus practically limited to the horizontal plane.

Figure 3:
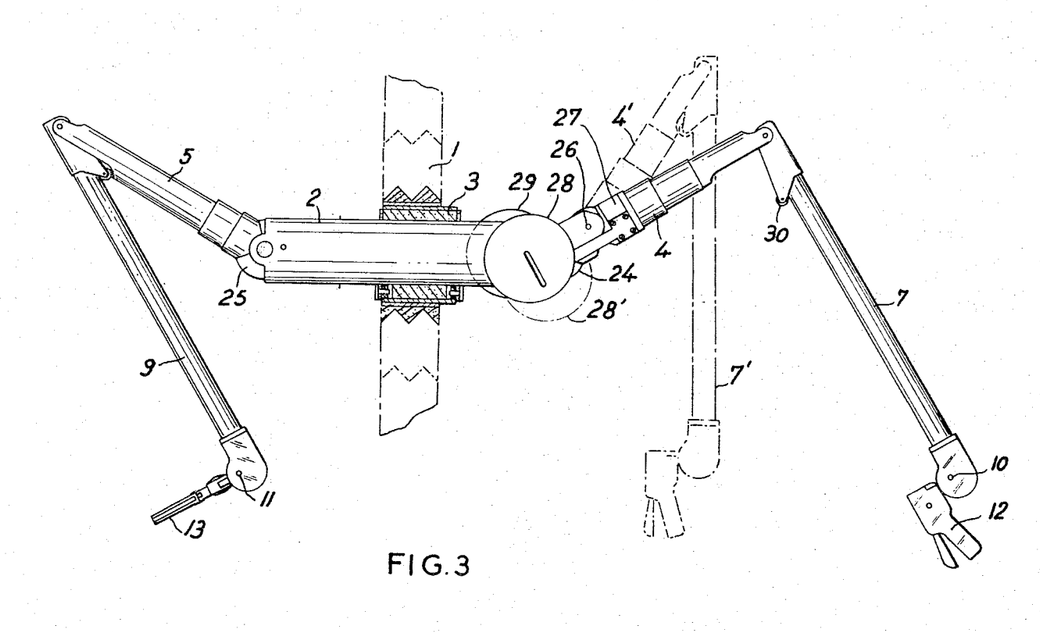
FIG. 3 is a side view of a first form of embodiment of the master-slave manipulator as diagrammatically illustrated in FIG. 1.

There is shown in FIG. 3 a general view of a first form of embodiment of a master-slave manipulator in accordance with that which has been shown diagrammatically in FIG. 1. There are again shown in this figure the shield wall 1, the horizontal wall-traversing member 2 and the auxiliary unit 3 with possibility of rotational movement. The arms 4 and 5 are carried by yokes 24 and 25 which provide a possibility of pivotal movement through ±45°. The yoke 24 of the master arm comprises a second articulation having an axis 26 about which is pivoted the master arm 4 through the intermediary of a small auxiliary yoke 27. When handling operations are performed, the movements of the arms take place about the pivot-pins of the yokes 24 and 25, the yokes 24 and 27 being coupled together by means of a interlocking system. The auxiliary pivotal motion of the yoke 27 about the pivot-pin 26 produces the relative displacement of the arms and results as will be seen later in the complementary relative displacement of the fore-arms.

Counterweights 28 and 29 ensure respectively the balancing of the master assembly and slave assembly as will also be explained in detail hereinafter.

The fore-arms 7 and 9 are of known design and there is shown in particular at 30 one of the pulleys which guides the cable for the transmission of rotational movement of the fore arm 7 about its longitudinal axis. There are also shown at the extremities of the fore-arms 7 and 9 the wrist articulations 10 and 11 to which are attached respectively the control handle 12 and the handling grab 13. There have been shown in chain-dotted lines the position 4' of the arm, the position 7' of the fore-arm and the position 28' of the counterweight when the yoke 27 is caused to pivot about the pin 26 in such manner as to initiate the auxiliary relative displacement of the slave assembly with respect to the master assembly.

FIG. 4 is a diagram of the cable arrangement of the various transmission systems of the master-slave manipulator in accordance with FIG. 3.

Figure 4A:
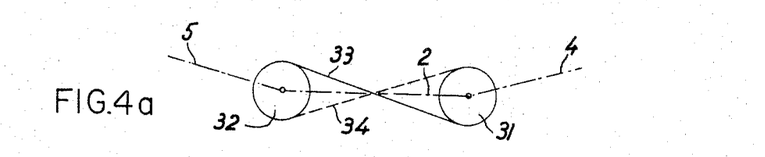
FIG. 4 is a diagram of the different cable systems of a master-slave manipulator in accordance with FIG. 3.

FIG. 4a shows diagrammatically the cable system which ensures the association of the angular movements of the arms 4 and 6 at the extremities of the horizontal member 2. Pulleys 31 and 32 which are integral with yokes 24 and 25 are fitted with a crossed cable or belt 33 and symmetrical pulleys located on the other side of the yokes 24 and 25 are fitted with an oppositely-acting crossed cable 34. It will thus be apparent that the symmetry of the arms 4 and 5 is ensured at the time of handling operations subject to the possibility of a different constant angle.

Figure 4B:
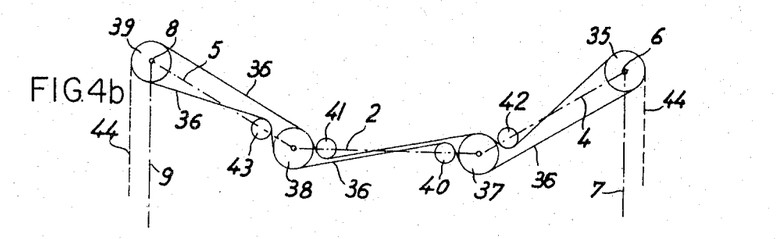

FIG. 4b shows diagrammatically the transmission of the angular movements of the fore-arms 7 and 9 about the shoulders 6 and 8. There is mounted on the elbow 6 a pinion 35 which is integral with the fore-arm 7 and on which is engaged a chain 36 passed over a pinion 37 which is identical with the preceding and carried by the axle-pin of the yoke 24. Similarly, a pinion 38 which is mounted on the axle-pin of the yoke 25 is fitted with the same chain 36 which is secured to a pinion 39, said pinion 39 being rotatably mounted on the elbow 8 and integral with the fore-arm 9. Pulleys 40 and 41 which are associated with the horizontal tube 2 prevent the chain 36 from leaving the pinions 37 and 38 at the time of end-of-travel displacements. Pulleys 42 and 43 which are respectively associated with the arms 4 and 5 complete the function of the pulleys 40 and 41. During all movements of the arms 4 and 5, the pinions 35, 37, 38 and 39 remain parallel to each other and therefore maintain the fore-arms 7 and 8 in parallel relation. The cables such as the cable 44 which produce the rotational movements of the fore-arms and the wrist movements of the control handle and grab follow the same path as the top run of the chain 36 along the arms 4 and 5 and along the horizontal member 2. Since the pinions 35 and 39 are integral with the fore-arms in the case of all movements of the arms and fore-arms, these cables such as the cable 44 remain stationary within the fore-arms and therefore are not subjected to any reaction of the preceding movements.

Figure 4C:
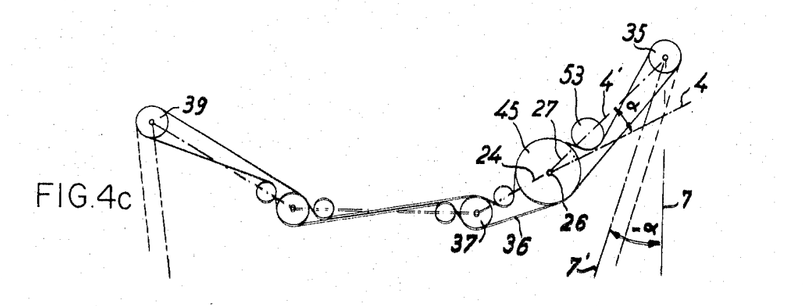

FIG. 4c shows diagrammatically the arrangement for producing the relative displacement of the arms. There is clearly shown therein the articulation of the yokes 24 and 27 about the pivot-pin 26, said yokes having been omitted from FIGS. 4a and 4b for the sake of greater clarity. There is mounted on the pin 26 a pulley 45 having a radius which is double the radius R of the pinions 35 and 39 of the fore-arms. When, without displacing the yoke 24, the arm 4 is lifted to position 4' and thus caused to pivot about the pin 26 through an angle $\alpha$, the bottom run of the chain 36 is wound over a length $2R\alpha$ and produces a relative movement of rotation of the arm and fore-arm of $-2\alpha$; the fore-arm has therefore been subjected to an absolute rotation through an angle $-\alpha$.

Figure 4D:
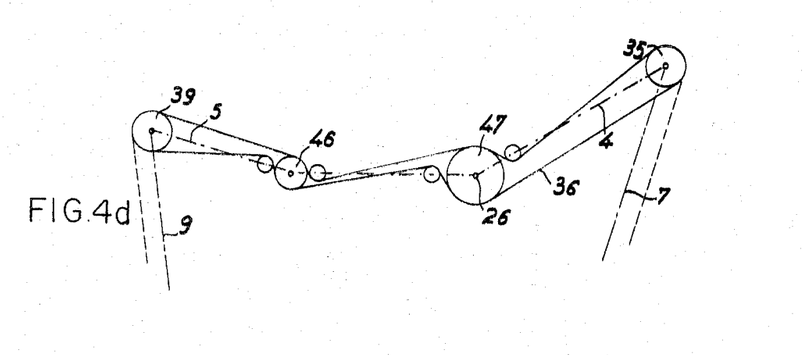

There has been shown diagrammatically in FIG. 4d an alternative form of cable system whereby the pivotal axis 26 is permitted to coincide with the pivotal axis of the yoke 24 and therefore at the same time to dispense with the auxiliary yoke 27. This alternative form also makes it possible to reinforce the elbow movements. Inasmuch as the pinions 35 and 39 which are attached to the fore-arms 7 and 9 have a radius R, a pulley 46 having a radius $r<R$ is mounted on the shoulder at the slave end instead of the pinion 38 which has the same radius and, similarly, a pulley 47 having a radius $2R-r$ is mounted at the master end. It will be apparent that, since the arms 4 and 5 remains symmetrical with respect to the wall in the case of an angle of radial movement $\alpha$, the sum of the lengths which are wound onto the pulleys 40 and 41 is equal to:

$$(r+2R-r)\alpha = 2R\alpha$$

this length being such as to maintain the fore-arms 7 and 9 in parallel relation. On the other hand, if the master arm 4 is lifted through an angle $\alpha$ without moving the slave arm 5, the bottom run of the chain 36 is wound onto the pulley 47 over a length $(2R-r)\alpha$ and produces a relative movement of rotation of the master fore-arm with respect to the master arm of $$\frac{(2R-r)\alpha}{r}$$

namely an absolute rotation of the master fore-arm of $\alpha(1-r/R)$. As shown in FIG. 4b, the other transmission cables follow the top path of the chain 36. The ratio of the movement of relative displacement of the arm to that of the fore-arm can be determined as a function of the relative lengths of these two members by establishing the ratio $r/R$.

FIG. 5 represents a diagram of the arrangements adopted for balancing the master-slave manipulator in accordance with FIG. 3.

Figure 5A:
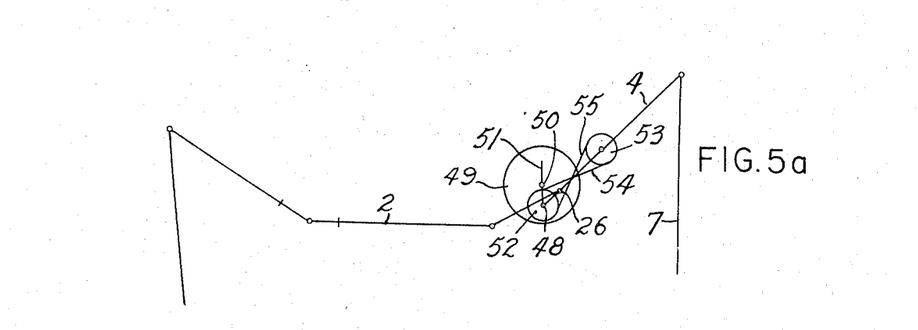
FIG. 5 is a diagram of the balancing systems of a master-slave manipulator in accordance with FIG. 3.

The balancing arrangement which is adopted in the case of the master assembly has been shown diagrammatically in FIG. 5a. In order to balance the weight of the arm 4 with respect to the pivotal axis 26 of the yoke 24, the fore-arm 7 being assumed to be in the vertical position, it would merely be necessary to place a counterweight which is centered at 48; in order to make it possible in addition to balance the fore-arm 7 when this latter is inclined to the vertical, it will merely be necessary to center said counterweight 49 at 50 on a pin 51 and to cause said pin 51 to remain parallel to the fore-arm 7 by means of the pinions 52 and 53 and by means of the oppositely-acting cables, chains or belts 54 and 55. It can be noted that said pinion 53 can be the guide pinion of the chain 36 which is shown in FIG. 4c.

Figure 5B:
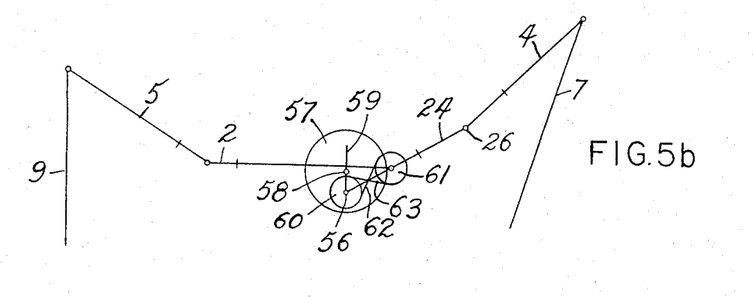

The balancing arrangement which is adopted in the case of the slave assembly has been shown diagrammatically in FIG. 5b. In order to balance the slave arm, it would merely be necessary to place a counterweight at 56; however, in order to take into account the angular displacements of the slave fore-arm 9 as well as the resultant at 26 of the previous balancing, it can be visualized that it will merely be necessary to center the counterweight 57 at 58 on a pin 59 which must remain symmetrical with the fore-arm 9. This control system can be carried into effect by means of two pinions 60 and 61 and two oppositely-acting cables 62 and 63 since the yoke 24 remains symmetrical with the slave arm 5. It should be noted that the pinion 60 can be the same as the guide pinion 37 of the chain 36 which is shown in FIGS. 4b and 4c.

There will now be described a second form of embodiment of a master-slave manipulator which corresponds to that shown in FIG. 1.

Figure 6:
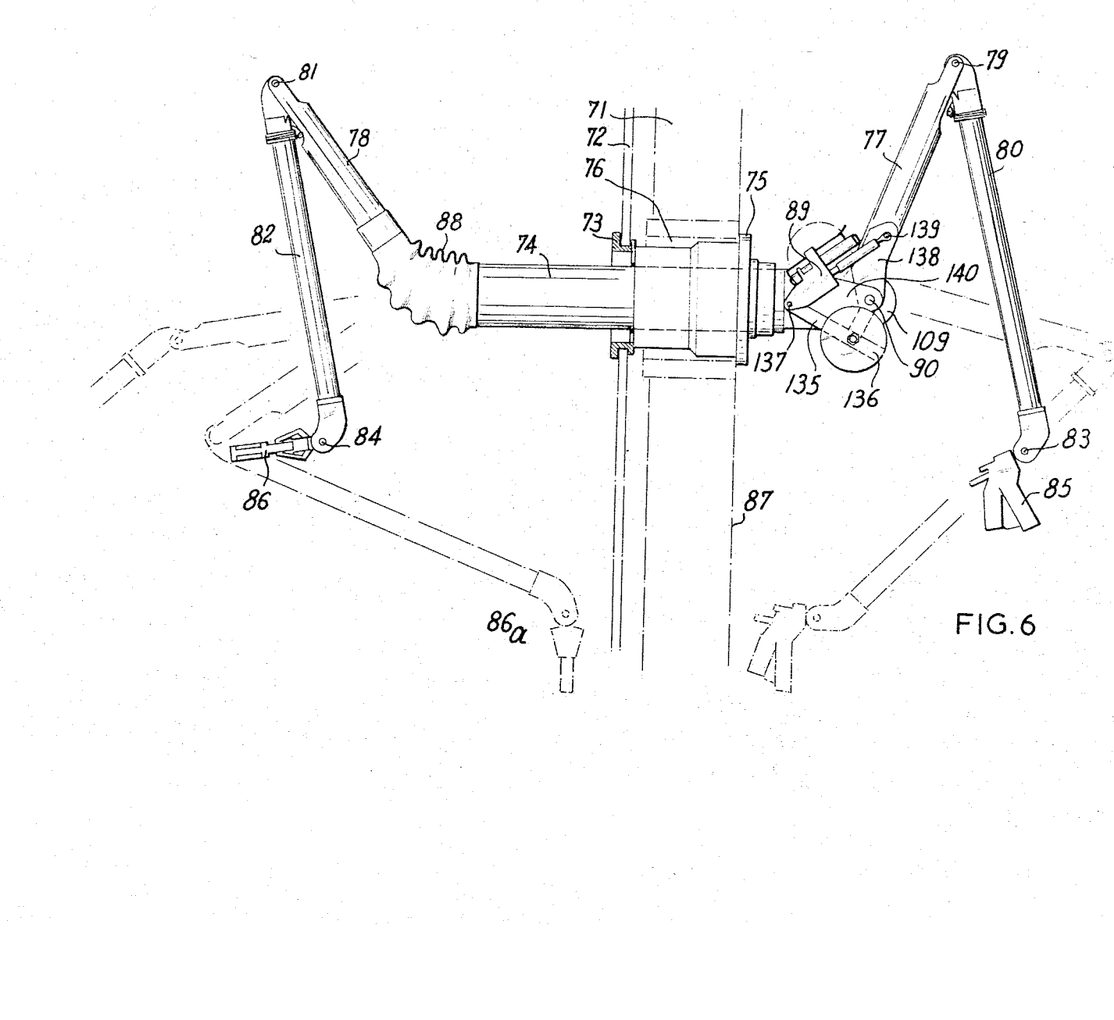
FIG. 6 is a general view of a second form of embodiment of a master-slave manipulator comprising two articulated members, as improved according to the invention.

There can be seen from FIG. 6 the shield wall 71 of the hot cell, the wall 72 of the leak-tight chamber and the special throughway member 73 to which can be secured flexible shielding means. The wall-traversing tube 74 is fitted within an intermediate unit 75 and is free to pivot therein about its horizontal axis. The said intermediate unit 75 is commonly referred-to as a "roller tube" and is in turn fitted within a suitable opening 76 formed in the shield wall 71.

A master arm 77 and a slave arm 78 are associated in their respective pivotal movements in such manner as to rotate through proportional angles in opposite directions; these angles can have the same value, in which case the angular movements of the master arm 77 and slave arm 78 are symmetrical; said angles can be proportional, in which case the master arm 77 and the slave arm 78 will have proportional lengths in inverse ratio so as to permit of equal unitary movements of their extremities in the case in which it is sought to carry out remote handling operations in a ratio of unitary displacement which is equal to one. In another case in which it is sought to perform remote handling operations in a ratio of displacement other than one to one, use will be made on the contrary of these angular ratios and these length ratios depending on the object which is contemplated.

A master fore-arm 80 is pivotally coupled to the elbow 79 of the master arm 77 and a slave fore-arm 82 corresponding to said master fore-arm is pivotally coupled to the elbow 81 of the slave arm 78. These two master and slave fore-arms are associated in their pivotal movement about their respective elbows in such manner as to describe proportional angles in the same direction. In a particular case, these angles will be equal, but the use of proportional angles can be made to correspond to the use of fore-arms having a proportional length in the inverse ratio which is intended to impart equal unitary displacements to the extremities thereof in the case in which manipulations are to be carried out in a ratio of one to one. In the case of manipulations in a ratio other than one to one, the use of proportional angles and ratios of fore-arm lengths will be determined according to the purpose to be achieved.

The said fore-arms 80 and 82 are capable of performing a movement of rotation or so-called azimuthal movement about the longitudinal axis thereof and are each provided with a wrist articulation, respectively designated by the references 83 and 84, on which are mounted at the master end a control handle 85 which is endowed with two degrees of freedom of perpendicular rotational movement one of which has an axis at right angles to the axis of azimuthal rotation and, at the slave end, a handling grab 86 which is designed to reproduce three movements of rotation which correspond in the case of the slave arm to the movements of the master arm, said movements being transmitted by cables, belts, chains or any other suitable device.

In order to work with the grab 86 close to the wall 72 of the hot cell, the operator would normally have to place his hand very far away from the work face 87 and from the viewing window (not shown) which is provided in said face. In order to reduce this distance and enable the operator to bring the grab 86 close to the wall 72 while remaining near the viewing window, the master-slave manipulator has been endowed with an auxiliary relative displacement of the arms which is also shown in FIG. 1. Said relative displacement consists in causing the slave assembly to pivot about the slave shoulder 88 while the master assembly remains motionless. There can be seen at 86a the position which is reached by the grab 86 when the aforesaid relative displacement is carried out under maximum conditions. Said relative displacement can be initiated by an actuating unit 89 driven by an electric motor as will be more specifically described below, or by any other suitable means.

Figure 7:
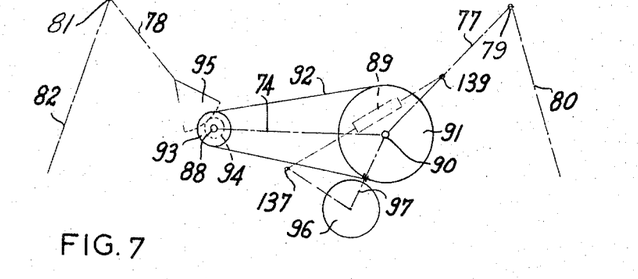
FIG. 7 is a kinematic diagram of the transmission of the shoulder movement in a master-slave manipulator in accordance with FIG. 6.

FIG. 7 shows the kinematic connection and cable system of the shoulder mechanism of the master-slave manipulator in accordance with FIG. 6. There is adapted to rotate about the axis 90 of the master shoulder a great pulley 91 to which is fixed a cable or chain 92 which is intended to be wound onto a small pulley 93 of the slave shoulder 88. The small pulley 93 is integral with a pinion 94 which meshes with a great sector 95, said sector being in turn integral with the slave arm 78. The pulley 91 is made integral with the master arm 77 and the assembly 77–91–92–93–94–95–78 constitutes the kinematic chain of the shoulder mechanism. The respective diameters are determined in such manner as to ensure the ratio of desired angular displacements of the arms 77 and 78. In the particular case in which the angles are opposite, the balancing of the slave arm 78 is carried out by mounting a counterweight 96 at the end of a lever 97 which is integral with the pulley 91 and so arranged that the angle made by said lever with the horizontal is the same as that of the slave arm 78. The movement of relative displacement which will be explained in greater detail hereinafter and which can be initiated by means of the actuating unit 89 consists of a relative movement of rotation of the pulley 91 with respect to the master arm 77.

Figure 8:
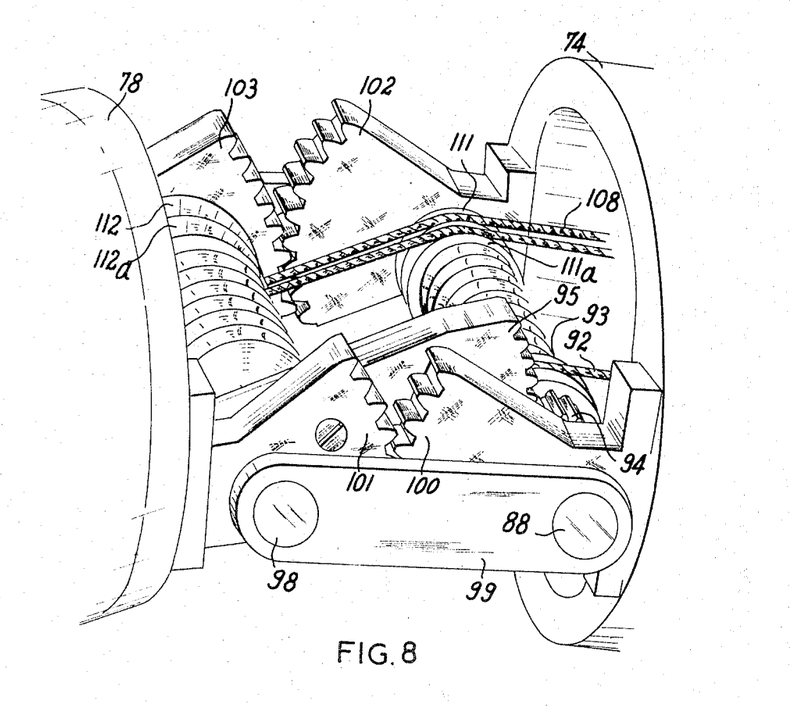
FIG. 8 is a detail view in isometric perspective of the slave shoulder articulation.

FIG. 8 shows in constructional detail the mechanisms of the slave shoulder 88. The transmission of the movement of the pulley 91 to the arm 78 is carried out through the intermediary of the pinion 94 which rotates about the axle-pin 88, meshes with the great toothed sector 95 which in turn rotates about the other axle-pin 98. The axle-pins 88 and 98 are coupled together by a connecting-arm 99 which constantly remains in such a position as to bisect the angle which is made by the through-tube 74 and the arm 78. The interaction of said tube and said arm is ensured by means of equal toothed sectors 100 and 101 on the one hand and 102 and 103 on the other hand which are respectively integral with the through-tube 74 and the arm 78.

Under these conditions, and in the particular case of opposite angles of radial movements of the arms 77 and 78, if the pulley 91 has a diameter which is double that of the pulley 93, the pinion 94 will have a diameter which is five times smaller than the sector 95 and the ratio of differential transmission, after engagement with the sectors 100 and 101 will be 1:2, thereby ensuring a transmission through an equal and opposite angle between the pulley 91 and the arm 78.

The manner in which a transmission would be obtained when an angular ratio is chosen which is different from 1:1 can thus readily be deduced from the foregoing.

FIG. 8 also shows pulleys such as 111 and 112 which are mounted on the axle-pins 88 and 98 and over which are intended to pass the cables such as 108 for the transmission of the fore-arm movements.

Figure 9:
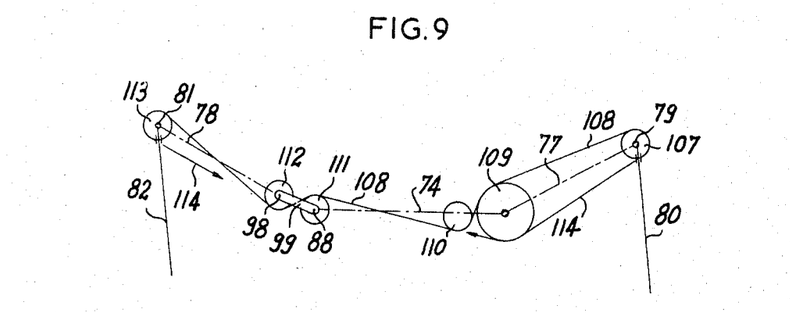
FIG. 9 is a kinematic diagram of the transmission of the elbow movement.

FIG. 9 shows the arrangement adopted for the cable transmission of the elbow movements. The movement of the master fore-arm 80 is transmitted to the slave fore-arm 82 by means of cables or chains which rest on different pulleys in the region of the shoulder at the master end and at the slave end. A pulley 107 which is mounted on the pivot-pin 79 of the master elbow is integral with the fore-arm 80. A transmission cable or chain 108 is wound onto said pulley and is brought to bear on a pulley 109 which is adapted to rotate about the pivot-pin 90 of the master shoulder. The cable 108 is then carried on a pulley 110, then on pulleys 111 and 112 which are mounted on the axle-pins 88 and 98 which have already been shown in FIG. 8. The cable 108 is then secured to the pulley 113 of the slave elbow 81, said pulley being integral with the slave fore-arm 82.

The transmission of movement in both directions is carried out by two lengths of cable or chain which are oppositely-acting. The top length 108 accordingly follows the path previously described over the pulley 109 whilst the bottom length 114 passes under a pulley 112a which is located next to the pulley 112, then over a pulley 111a which is located next to the pulley 111 (as shown in FIG. 8) so as to pass under the pulley 109 and finally return to the pulley 107 which is integral with the master fore-arm.

In the particular case of angular movements through equal angles, the pulleys 107 and 113 are equal and will have proportional diameters in the case of angular movements through proportional angles. The two cable lengths which pass over the pulleys such as 111 and 112 at the time of angular movements of the slave shoulder 88 are not subjected to any variation in tension as they pass through this articulation. In fact, since the connecting-arm 99 remains constantly on the line which bisects the angle made by the arm 78 and the through-tube 74, the length which is wound onto the pulley 112 is equal to the length which is unwound from the pulley 111 or conversely.

Under these conditions, if the particular case is considered in which the radial movement of the arms 77 and 78 is a displacement through opposite angles, it can be visualized that, if the diameter of the pulley 109 is equal to the sum of the diameters of the pulleys 107 and 113, the fore-arms 80 and 82 remain parallel to each other at the time of a shoulder movement. Conversely, it will be apparent that it is possible to determine the diameter of the pulley 109 if the angular movements of the arms 77 and 78 are proportional in order to ensure that the fore-arms 80 and 82 also remain parallel at the time of shoulder movements. As will also be apparent, it is possible to choose the diameter of the pulley 109 so that, when a shoulder movement takes place, there takes place a functional displacement of the fore-arms 80 and 82 which can be employed for the purpose of improving the performances of the manipulator, particularly in regard to the reach of the handling arm.

Figure 10:
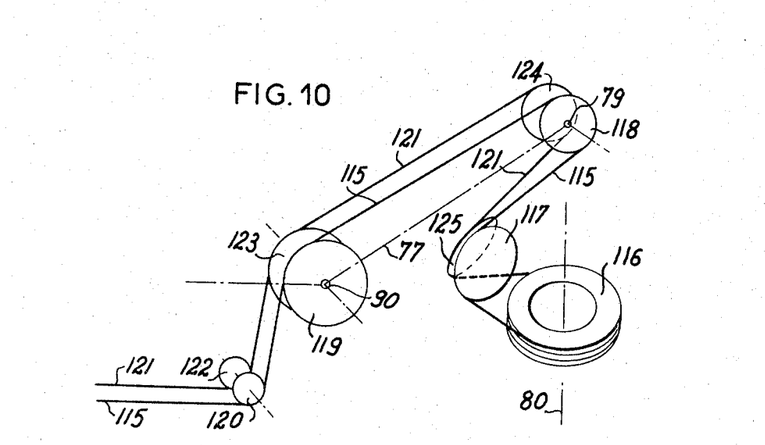
FIG. 10 is a kinematic diagram of the transmission of the rotational movement of the fore-arm.

FIG. 10 shows the cable system of the azimuthal movement of the fore-arms 80 and 82 about their axes. The cable 115 for the transmission of this movement is attached to a pulley 116 which is integral with the master fore-arm 80, passes over a guide pulley 117, then over a pulley 118 which is similar to the pulley 107 and then follows the same path as the top run 108 of the cable which is described in reference to FIG. 9, namely over the pulley 119 which is similar to the pulley 109, under the pulley 120 which is similar to the pulley 110, and so forth. After transmission of the movement to the slave fore-arm, the oppositely-acting cable length 121 follows the reverse path under the pulley 122, over the pulleys 123 and 124 and finally over the guide pulley 125.

Figure 11:
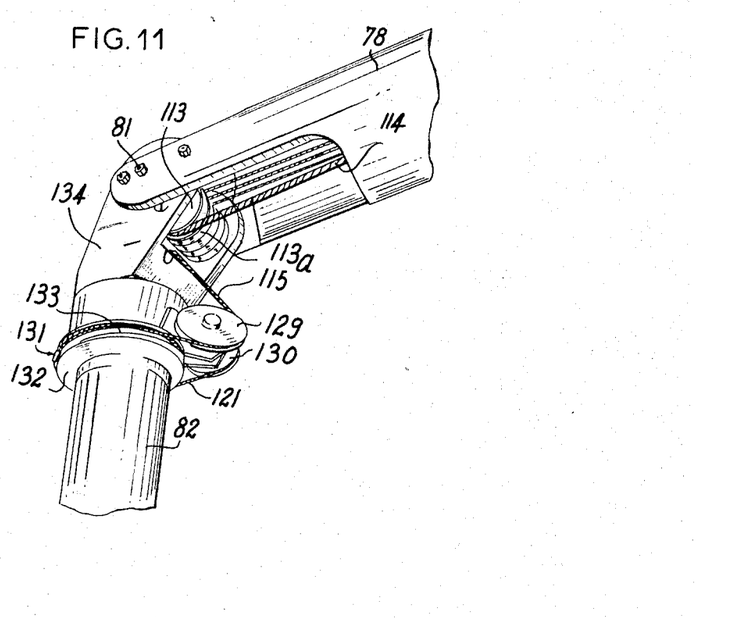
FIG. 11 is a detail view in isometric perspective of the slave elbow articulation.

The wrist movements are re-transmitted from the master wrist 83 to the slave wrist 84 (as shown in FIG. 6) by cables which are five in number, one cable being employed for the purpose of producing the clamping action of the grab 86 whilst the four others which are oppositely-acting in pairs jointly effect the transmission of the two degrees of freedom which are perpendicular rotational movements of the wrist. The combined assembly of these cables is placed within the tube 80 which constitutes the master fore-arm and is made to pass over five identical pulleys which are similar to the pulley 107 (as shown in FIG. 9) then follow the same path as the top run 108 for the transmission of elbow movement so as to pass over five identical pulleys such as the pulley 113a (as shown in FIG. 11) which are similar to the pulley 113, and then to follow a similar path within the tube 82 which constitutes the slave fore-arm. These pulleys have diameters which are equal or proportional to the similar pulleys 107, 109, 110, 111, 112, 113 over which the elbow-movement transmission cable 108 travels (as shown in FIG. 9).

Under these conditions, inasmuch as in any movement of deformation of the articulated polygon, the top run 108 for the transmission of elbow movement retains a constant tension, the same applies to all of the cables for transmitting the fore-arm movements, even when a movement of relative displacement is effected. In addition, these cables assist in the movement of extension of the elbow by adding their force to the top transmission run 108.

FIG. 11 shows the mechanical arrangement of the elbow articulation such as 79 or 81. There has been shown the axle-pin 81 for the pivotal movement of the slave articulation, the pulley 113, the length 114 of the elbow movement transmission cable, the pulleys 129 and 130 which are similar to the pulleys 117 and 125 on the master side (as shown in FIG. 10) and the cable 115 for the transmission of azimuthal motion which is attached at 131 to the pulley 132 which is similar to the pulley 116 on the master side (as shown in FIG. 10). The said pulley 132 is provided with a helical groove 133 and the cable 115 is fixed in said groove at 131 in order to effectively ensure that the fore-arm 82 is thus actuated without slippage. The pulleys 129 and 130 are disposed at an oblique angle and return the cables 115 and 121 over two pulleys mounted side by side which are similar to the pulleys 118 and 124 at the master end (as shown in FIG. 10). A ball-bearing assembly which has not been shown in the drawings permits the rotation of the fore-arm 82 relatively to the elbow yoke 134.

Reference being made to FIG. 6, there will now be described the mechanism of the master shoulder articulation together with its relative displacement system. There can be seen in this figure the pulley 109 which is integral with the axle-pin 90. The member 135, on which the counterweight 136 is fixed, is mounted on said axle-pin 90. There is mounted on said member 135 at 137 a pin to which is fixed an actuating unit 89 driven by an electric motor which will serve to produce the movement of relative displacement. The master arm 77 terminates in a forked member 138 which is pivotally mounted about the axle-pin 90. Said forked member is fitted at 139 with a pin which is similar to the pin 137 on which the other extremity of the actuating unit 89 is mounted.

Figures 12, 13:
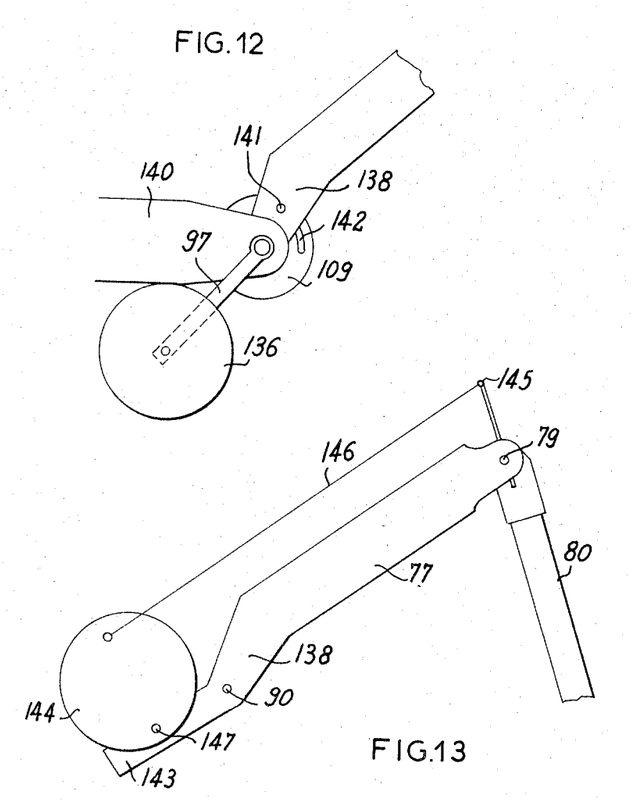
FIG. 12 is a mechanical diagram of a system for producing a relative displacement on the master shoulder.
FIG. 13 is a mechanical diagram of a system for balancing the master assembly.

In an alternative form in which the movement of relative displacement is simply produced by hand, FIG. 12 represents the forked member 140 which terminates the through-tube 74, the forked member 138 which terminates the master arm 77, and the pulley 109. A locking bolt 141 makes it possible to couple the forked member 138 directly to the pulley 109 in which a slot 142 has been formed. When said locking bolt 141 is withdrawn, the pulley 109 is released and the complete slave assembly of the master arm is thereby uncoupled.

It will be understood that, in these two cases, the slave arm 78 can move about the shoulder 88 and the combined assembly of cable connections which have been described heretofore is such that the lengths of cables do not change in length at the time of pivotal movements of the shoulder 88. Under these conditions, the cable lengths 108 and 114 (as shown in FIG. 9) are not subjected to any relative movement in the slave arm 78 and the elbow 81 does not perform any relative movement. The combined slave assembly which consists of slave arm, fore-arm, wrist and grab accordingly rotates as a single unit about the slave shoulder 88.

In the case of FIG. 12, the member 135 (shown in FIG. 6) is reduced to a lever 97 which carries the counterweight 136 which balances the slave arm 78.

The forked member 138 of the master arm 77 is additionally provided, as appears from FIG. 13, with an extension 143 carrying a counterweight 144 which balances the master arm 77 about the axle-pin 90. In order to balance the fore-arm 80 about the axle-pin 79, it would be necessary to place a counterweight on an extension of this latter at 145. In point of fact, the connecting-arm 146 retransmits the angular movements of the fore-arm 80 to the counterweight 144 and it is merely necessary to mount said counterweight off-center about the axle-pin 147 in order to effect the complete balancing of the master assembly without any additional counterweight.

The slave assembly which is balanced by the counterweight 136 carried by the member 135 (as shown in FIG. 6) can also be balanced in a strictly accurate manner, including the fore-arm 82, by making use of the cables 108 and/or 114 which pass over the pulleys 110 (as shown in FIG. 9) for the purpose of transmitting the necessary balancing movement to the counterweight for balancing the slave assembly. This mechanical detail is not shown in the figures.

Figure 14:
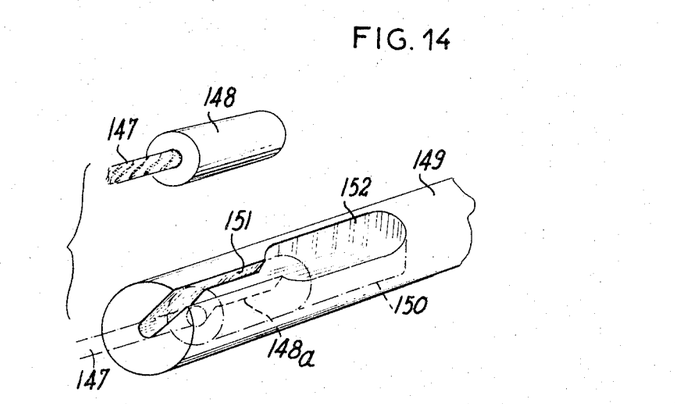
FIG. 14 is a view in isometric perspective of a system for securing the cables.

FIG. 14 shows a detail of the system of attachment of the transmission cables, especially within the through-tube 74. The assembly of transmission cables located within this tube is designed so that the lengths of flexible cable which are employed do not depend on the length which has been established for said tube at the time of its manufacture, provided on the other hand that the lengths of arms and fore-arms remain invariable.

Under these conditions, the transmissions within the interior of the through-tube 74 are provided by means of rigid rods; said rods are adapted to slide freely between the lead members which may prove necessary for ensuring continuity of the biological shielding of the hot cell within the interior of the through-tube. These rigid transmission members constitute at the same time tension-regulating distance-bars while being designed at the same time to permit the uncoupling of the cables at each of the ends of said rods.

FIG. 14 shows the extremity 147 of a flexible transmission cable on which is shrunk a cylindrical anchoring member 148. The distance-bar 149 is internally bored at 150 to a diameter which is sufficient to permit the insertion of the anchoring member 148. On the other hand, the extremity of said distance-bar is only provided with a slot 151 which permits the single cable 147 to pass therethrough. An elongated slot 152 permits the introduction of the anchoring member 148 and it is then merely necessary to pull on the cable 147 in order that said member should thus come into the position 148a from which it can no longer escape.

Whenever it is possible to do so, the transmission cables which carry out the movements in those rectilineal portions in which no pulley is necessary are accordingly replaced by rigid transmission members which ensure minimum elastic extension of the transmission members. Such rigid members are placed in particular in the rectilineal portions of the arms 77 and 78 and, as has previously been stated, in the rectilineal portions of the through-tube 74.

As will be readily understood, and as the foregoing description has furthermore made apparent, the present invention is not limited in any sense either to the mode of application or to the constructional examples which have been more especially described and illustrated but is intended, on the contrary, to bring all alternative forms within its scope.

What I claim is:

1. A direct action master-slave manipulator comprising a stationary wall-traversing member, shoulder pivots at the extremities of said wall member, a master polygonal assembly and a slave polygonal assembly articulated on said pivots respectively, each of said assemblies comprising at least one arm and one fore-arm, means for coupling the master and slave arms to pivot about their respective shoulders through two angles in opposite directions, means for changing said two angles to a different constant angle, means for coupling the master and slave fore-arms to pivot about their respective elbows through angles in the same direction, means for changing said last named angles to a different constant angle, master and slave members, means for coupling the master and slave members to pivot at constant angles about their respective wrists, means for changing said constant angles in an auxiliary manner and means for balancing the master and slave arms and fore-arms.

2. A manipulator as described in claim 1, the master and slave arms remaining symmetrical when angularly displaced about their shoulders, said means for changing said angles to a different constant angle changing said angles relatively to the plane of the wall and means for changing said constant angle in an auxiliary manner.

3. A manipulator as described in claim 2, the master arms being integral with a master shoulder pulley having the same axis as the angular movement of displacement about the master shoulder and the slave arm being integral with a slave shoulder pulley having the same axis as the angular movement of displacement about the slave shoulder, said pulleys having different diameters in a ratio which is equal to the ratio of the angles of pivotal displacement about the shoulders, said pulleys being connected for their rotational movements by means of two oppositely acting and crossed flexible-non-extensible members.

4. A manipulator as described in claim 1, the master and slave fore-arms remaining parallel when angularly displaced about their elbows and means for varying the constant angle between the master and slave fore-arms in an auxiliary manner.

5. A manipulator as described in claim 4, the master fore-arm being integral with a master elbow pulley having the same axis as the angular movement of displacement about the master elbow, the slave fore-arm being integral with a slave elbow pulley having the same axis as the angular movement of displacement about the slave elbow, said elbow pulleys being connected for their rotational movements by two oppositely acting flexible non-extensible members, loose pulleys mounted on the master and slave shoulder pins and guide pulleys directing said flexible non-extensible members, the sum of the diameters of said loose pulleys being equal to the sum of the diameters of said elbow pulleys, said elbow pulleys having the same diameter.

6. A manipulator as described in claim 1, the master and slave arms pivoting through proportional angles in opposite directions when angularly displaced about their shoulders and means for varying the constant angle between the master and slave arms in an auxiliary manner.

7. A manipulator as described in claim 6, the master arm being integral with a master shoulder pulley having the same axis as the angular movement of displacement about the master shoulder and the slave arm being integral with a slave shoulder pulley having the same axis as the angular movement of displacement about the slave shoulder, said pulleys having different diameters in a ratio which is equal to the ratio of the angles of pivotal displacement about the shoulders, said pulleys being connected for their rotational movements by means of two oppositely acting and crossed flexible non-extensible members.

8. A manipulator as described in claim 1, the master and slave fore-arms pivoting through proportional angles in the same direction when angularly displaced about their elbows and means for varying the constant angle between the master and slave fore-arms in an auxiliary manner.

9. A manipulator as described in claim 8, the master fore-arm being integral with a master elbow pulley having the same axis as the angular movement of displacement about the master elbow and the slave fore-arm being integral with a slave elbow pulley having the same axis as the angular movement of displacement about the slave elbow, said elbow pulleys being connected for their rotational movements by two oppositely acting flexible non-extensible members, two loose pulleys mounted on the master and slave shoulder pins and guide pulleys directing said flexible non-extensible members, the sum of the diameters of said loose pulleys being equal to the sum of the diameters of said elbow pulleys, said elbow pulleys having different diameters in a ratio which is equal to that of the angles of displacement about the elbows.

10. A manipulator as described in claim 1, the constant angle between two similar members remaining invariable during angular displacements of the other members.

11. A manipulator as described in claim 1, the constant angle between two similar members being functionally dependent on the angular displacement of the other members.

12. A manipulator as described in claim 11, the master fore-arm being integral with a master elbow pulley having the same axis as the angular movement of displacement about the master elbow and the slave fore-arm being integral with a slave elbow pulley having the same axis as the angular movement of displacement about the slave elbow, said elbow pulleys being connected for their rotational movements by means of two oppositely acting flexible non-extensible members, two loose pulleys mounted on the master and slave shoulder pins and guide pulleys directing said flexible non-extensible members, said elbow pulleys having different diameters in a ratio which is equal to that of the angles of radial displacement of the elbows, the sum of the diameters of the elbow pulleys and the sum of the diameter of the shoulder pulleys being different, the ratio of thsee two sums being equal to the ratio of the angle of radial displacement about the master shoulder to the variation of said constant angle which is functionally dependent on the angular movements of displacement of the other members.

13 A manipulator as described in claim 1, said means for changing the constant angle being motor means.

14. A manipulator as described in claim 1, the master arm being integral with a master shoulder pulley, a flexible non-extensible member secured to the master shoulder pulley, said member being wound onto a slave shoulder pulley, a toothed pinion integral with the slave shoulder pulley and having the same axis, said toothed pinion meshing with a toothed sector, the toothed sector being integral with the slave arm, the successive diameters of said pulleys, of said pinion and of said sector providing the desired ratio of the angles of displacement about the shoulders, said ratio normally being equal to one.

15. A manipulator as described in claim 1, the master fore-arm being integral with a master elbow pulley having the same axis as the angular movement of displacement about the master elbow and the slave fore-arm being integral with a slave elbow pulley having the same axis as the angular movement of displacement about the slave elbow, said elbow pulleys being connected for their rotational movements by means of two oppositely acting flexible non-extensible members, a loose pulley mounted on the master shoulder pin and a guide pulley directing said flexible non-extensible members in one direction, two equal pulleys directing said flexible non-extensible members in the opposite direction, one of said equal pulleys being mounted on the slave shoulder pin, the axle pins of said equal pulleys being coupled by a connecting arm pivoting through an angle which is one half the angle of radial displacement of the slave arm.

16. A manipulator as described in claim 21, the master arm being integral with a master shoulder pulley having the same axis as the angular movement of displacement about the master shoulder and the slave arm being integral with a slave shoulder pulley having the same axis as the angular movement of displacement about the slave shoulder, said pulleys being connected for their rotational movement, means for uncoupling said master arm from said master shoulder pulley and for relatively displacing said master arm by a constant angle with respect to said master shoulder pulley and for a corresponding relative displacement of the elbow movements whereby the entire slave assembly pivots as a single unit about the slave shoulder.

17. A manipulator as described in claim 1, said means for balancing the slave assembly being located at the level of the master shoulder and including a counterweight, a connecting arm for said counterweight pivoting in the same direction and through the same angle as the slave arm, said counterweight swinging about said connecting arm through the same angle as the relative angular displacement of the slave fore-arm with respect to the slave arm by one of the flexible non-extensible members transmitting the angular movements of displacement of the elbows.

18. A manuipulator as described in claim 1, said means for balancing the master assembly being located at the level of the master shoulder and including a counterweight, an extension of the master arm carrying said counterweight, said counterweight swinging about said extension through the same angle as the relative angular displacement of the master forearm with respect to the master arm by one of the flexible non-extensible members for the transmission of the angular movements of displacement of the elbows.

19. A manipulator as described in claim 1, said means for balancing the master assembly being located at the level of the master shoulder and including a counterweight, a connecting arm for the counterweight pivoting in the same direction and through the same angle as the slave arm, said counterweight swinging about said connecting arm through the same angle as the relative angular displacement of the slave fore-arm with respect to the slave arm by a second connecting arm secured at one end to said counterweight at a point spaced from the center of the counterweight and at the other end to an extension of the master fore-arm beyond the master elbow.

References Cited by the Examiner

UNITED STATES PATENTS 3,219,200   11/1965   Ainsworth ____________ 214—1

FOREIGN PATENTS 963,930   7/1964   Great Britain.

GERALD M. FORLENZA, *Primary Examiner.*

ROBERT G. SHERIDAN, *Examiner.*